United States Patent
Budde

(10) Patent No.: US 10,103,570 B2
(45) Date of Patent: Oct. 16, 2018

(54) UNINTERRUPTIBLE POWER SUPPLY CONTROL

(71) Applicant: SCHNEIDER ELECTRIC IT CORPORATION, West Kingston, RI (US)

(72) Inventor: Kristian Budde, Kolding (DK)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 67 days.

(21) Appl. No.: 14/906,402

(22) PCT Filed: Aug. 2, 2013

(86) PCT No.: PCT/US2013/053446
§ 371 (c)(1),
(2) Date: Jan. 20, 2016

(87) PCT Pub. No.: WO2015/016944
PCT Pub. Date: Feb. 5, 2015

(65) Prior Publication Data
US 2016/0164341 A1    Jun. 9, 2016

(51) Int. Cl.
*H02J 9/00* (2006.01)
*H02J 1/00* (2006.01)
(Continued)

(52) U.S. Cl.
CPC ............ *H02J 9/061* (2013.01); *H02J 9/062* (2013.01); *H02M 7/04* (2013.01); *H02M 7/44* (2013.01)

(58) Field of Classification Search
CPC ............ H02J 9/061; H02J 9/062; H02M 7/04; H02M 7/44
(Continued)

(56) References Cited

U.S. PATENT DOCUMENTS 7,847,435 B2 * 12/2010 Groff ............... H02J 9/061
307/64
9,041,250 B1 * 5/2015 Czamara ............ H02J 3/14
307/64
(Continued)

FOREIGN PATENT DOCUMENTS

CN    202535279 U    11/2012
DE    102012100673 A1    8/2013

OTHER PUBLICATIONS

Notification of Transmittal of the International Search Report and the Written Opinion of the International Searching Authority from corresponding PCT/US2013/053446 dated Jan. 9, 2014.
(Continued)

*Primary Examiner* — Brandon S Cole
(74) *Attorney, Agent, or Firm* — Lando & Anastasi, LLP

(57) ABSTRACT

Systems and methods of controlling an uninterruptible power supply are provided. The uninterruptible power supply includes an input configured to receive input power having three phases, an output configured to provide output power, a power conversion circuit coupled with the input and the output, one or more sensors configured to monitor one or more parameters related to the output power, and a controller coupled with the power conversion circuit and the one or more sensors. The controller is configured to receive, from the one or more sensors, values for the one or more parameters, and based on the values for the one or more parameters, select a number of phases of the input power for receiving power for the power conversion circuit.

17 Claims, 5 Drawing Sheets

(51) Int. Cl.
*H02J 9/06* (2006.01)
*H02M 5/45* (2006.01)
*H02M 7/04* (2006.01)
*H02M 7/44* (2006.01)

(58) Field of Classification Search
USPC .................................................. 307/43–87
See application file for complete search history.

(56) References Cited

U.S. PATENT DOCUMENTS

| | | | |
|---|---|---|---|
| 2005/0018454 A1* | 1/2005 | Deng | H02J 7/35 363/49 |
| 2005/0036248 A1* | 2/2005 | Klikic | H02J 9/062 361/42 |
| 2005/0105229 A1* | 5/2005 | Deng | H02J 9/062 361/90 |
| 2006/0133120 A1* | 6/2006 | Sato | H02M 5/4585 363/37 |
| 2008/0030078 A1* | 2/2008 | Whitted | H02J 9/061 307/66 |
| 2008/0042491 A1 | 2/2008 | Klikic et al. | |
| 2008/0179956 A1* | 7/2008 | Jiang | H02J 9/061 307/66 |
| 2009/0039706 A1 | 2/2009 | Kotlyar et al. | |
| 2010/0042344 A1* | 2/2010 | Heber | G01R 31/40 702/58 |
| 2011/0127854 A1* | 6/2011 | Cruz | H02J 9/005 307/131 |
| 2012/0008353 A1 | 1/2012 | Alexander | |
| 2012/0218684 A1* | 8/2012 | Andersen | H02J 9/04 361/601 |
| 2013/0015704 A1* | 1/2013 | Tsai | H02J 9/062 307/23 |
| 2014/0009096 A1* | 1/2014 | Imanaka | H02M 3/155 318/494 |
| 2015/0364990 A1* | 12/2015 | Humphrey | H02J 3/46 307/31 |

OTHER PUBLICATIONS

Extended European Search Report from corresponding European Application No. 13890443.8 dated Feb. 9, 2017.

* cited by examiner

UNINTERRUPTIBLE POWER SUPPLY CONTROL

CROSS-REFERENCE TO RELATED APPLICATIONS

This application is a U.S. National Stage Application under 35 U.S.C. § 371 of International Application No. PCT/US2013/053446, filed Aug. 2, 2013, titled UNINTERRUPTIBLE POWER SUPPLY CONTROL, which is hereby incorporated herein by reference in its entirety.

BACKGROUND

Field of Invention

At least one embodiment of the present invention relates generally to control of an uninterruptible power supply.

Discussion of Related Art

Uninterruptible power supplies (UPSs) are used to provide reliable power to many different types of electronic equipment. Uninterruptible power supplies regulate power provided to a load, and can provide backup power to a load in the event of a loss of primary power, such as during black out or brown out conditions. Some power can be lost in the providing of power by the UPS. The less power that is lost, the more efficiently the UPS can provide power to electronic equipment.

SUMMARY

At least one aspect of the invention is directed to an uninterruptible power supply. The uninterruptible power supply includes an input configured to receive input power having three phases, an output configured to provide output power, a power conversion circuit coupled with the input and the output, one or more sensors configured to monitor one or more parameters related to the output power, and a controller coupled with the power conversion circuit and the one or more sensors. The controller is configured to receive, from the one or more sensors, values for the one or more parameters, and based on the values for the one or more parameters, select a number of phases of the input power for receiving power for the power conversion circuit.

In some embodiments, the one or more parameters include a percentage load drawn on the uninterruptible power supply, relative to a rated load.

In some embodiments, the power conversion circuit includes a bus, and the one or more parameters include a measured voltage on the bus.

In some embodiments, the one or more parameters include a current reference of the controller.

In some embodiments, the output is configured to provide output power having three phases.

In some embodiments, the controller is configured to determine that the value of the one or more parameters is less than a first threshold and based on the comparison, select one as the number of phases of the input power for receiving power for the power conversion circuit.

In some embodiments, the controller is configured to determine that the value of the one or more parameters is greater than a first threshold and less than a second threshold and based on the comparison, select two as the number of phases of the input power for receiving power for the power conversion circuit.

In some embodiments, the controller is configured to determine that the value of the one or more parameters is greater than a second threshold and based on the comparison, select three as the number of phases of the input power for receiving power for the power conversion circuit.

In some embodiments, the uninterruptible power supply further includes a battery coupled to the output and configured to provide power to the output during a changing of the selection of the number of phases of the input power.

Aspects are also directed to a method for controlling an uninterruptible power supply including an input configured to receive input power having three phases, an output configured to provide output power, a power conversion circuit coupled with the input and the output, and a controller coupled with the power conversion circuit. The method includes receiving values for one or more parameters related to the output power and based on the values for the one or more parameters, selecting a number of phases of the input power for receiving power for the power conversion circuit.

Aspects are also directed to an uninterruptible power supply (UPS) system including an input configured to receive input power having three phases, an output configured to provide output power, a power conversion circuit coupled with the input and the output, and means for receiving values for one or more parameters related to the output power and based on the values for the one or more parameters, selecting a number of phases of the input power for receiving power for the power conversion circuit.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

An uninterruptible power supply (UPS) can operate in different modes depending on the load level on the UPS. For example, if there is no load on the UPS or the UPS is running in a bypass mode (or eco-mode), elements of the UPS may still be running at a low level while not supporting a load. The elements may continue to run so that the UPS can be ready to support the load in the event of a transfer from bypass mode or in the event of a change in the load level. While the power used to run the elements at a low level can be minimal, less power can be used if fewer elements are kept running. In some embodiments, the UPS is a three-phase UPS and will operate using only one of the three input phases in certain situations, such as when there is no load, low load, or the UPS is running in bypass mode. The UPS can ramp up from one to two to three phases as needed, depending on the load. By operating from less than all three phases when elements of the UPS are not supporting the load, less power can be lost and the UPS can run more efficiently. In some embodiments, the UPS includes an algorithm to transition from operating from one phase to three phases.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
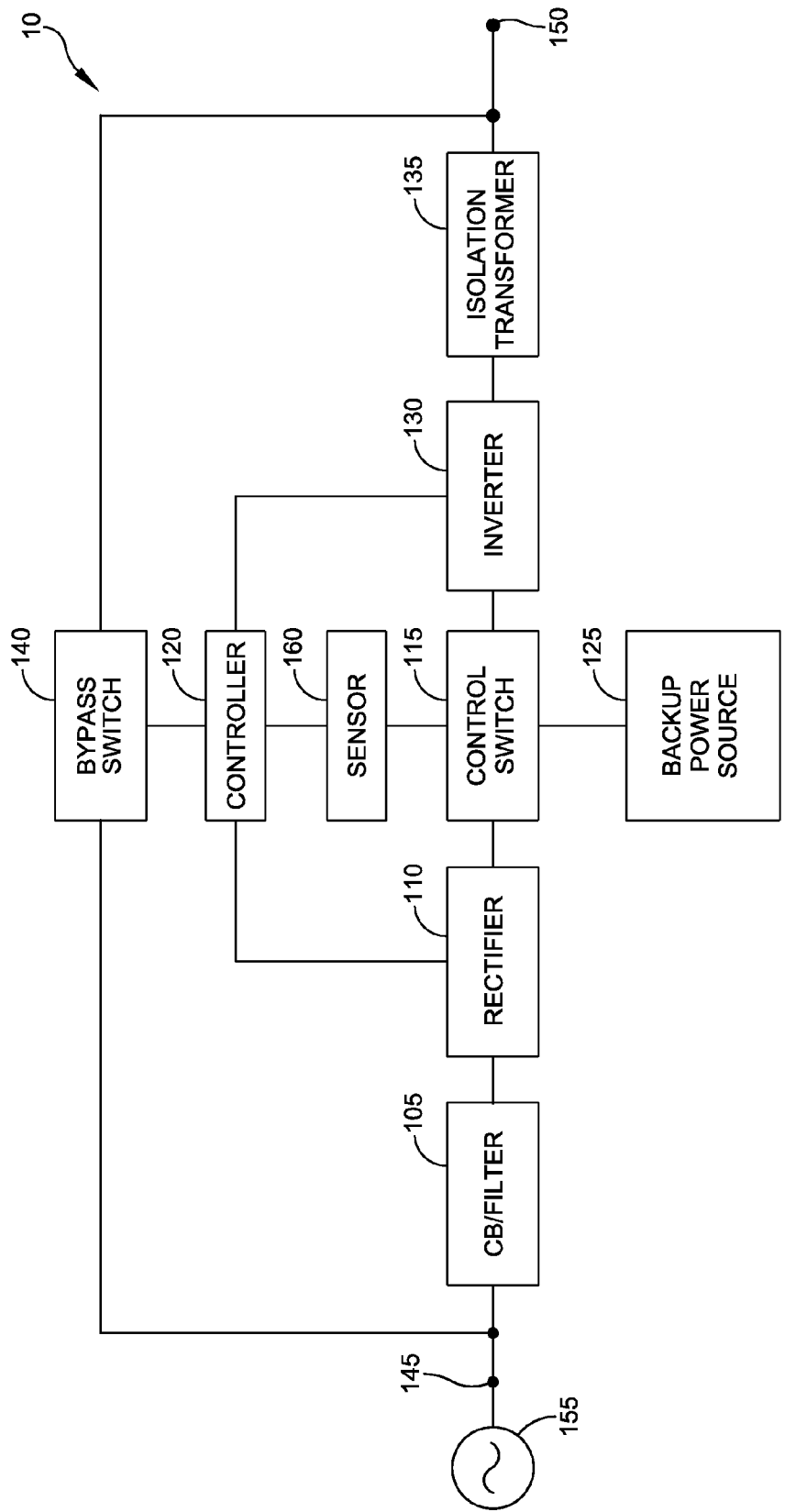
FIG. 1 is a functional block diagram depicting an example uninterruptible power supply in accordance with an embodiment.

FIG. 1 is a functional block diagram depicting an uninterruptible power supply (UPS) 100. The uninterruptible power supply 100 includes power conversion circuitry such as a circuit breaker/filter 105, a rectifier 110, a control switch 115, a controller 120, a backup power source 125, an inverter 130, a transformer such as an isolation transformer 135, and a bypass switch 140. The uninterruptible power supply 100 also includes at least one input 145 and output 150. The input 145 couples an AC power source 155 (e.g., grid power) with the uninterruptible power supply 100 and the output 150 couples the uninterruptable power supply 100 with a load.

In one embodiment, the circuit breaker/filter 105 receives power from the AC power source 155 via the input 145, filters the input power, and provides filtered power to the rectifier 110. In some embodiments, the AC power source 155 provides three-phase AC power. The rectifier 110 rectifies the filtered power, and provides rectified power to the control switch 115. The control switch 115 receives the rectified power from the rectifier 110, and receives DC power from the backup power source 125, such as a battery or fuel cell. Under the control of the controller 120, the control switch 115 provides power from the rectifier 110 to the inverter 130. For example, the controller 120 changes the state of the control switch 115 to couple the rectifier 110 with the inverter 130 when the controller 120 determines that the output power of the rectifier 110 is within a tolerance range. In some embodiments, the controller 120 determines that the output power of the rectifier 110 is outside a tolerance range, for example, during a black out or brown out condition. In this example, the controller 120 operates control of the switch 115 to provide DC power from the backup power source 125 to the inverter 130 directly or via intervening components such as the rectifier 110. The uninterruptible power supply 100 also provides power at the output 150 for a load via the backup power source 125 during failure of the AC power source 155. In some embodiments, the power provided by the uninterruptible power supply 100 at the output 150 is three-phase AC power.

The inverter 130 receives DC power output from the rectifier 110 or the backup power source 125, converts the DC power to AC power, and regulates the AC power. In some embodiments where the uninterruptible power supply 100 includes the isolation transformer 135, the inverter 130 provides regulated AC power to the isolation transformer 135. The isolation transformer 135 increases or decreases the voltage of the AC power output from the inverter 130, and provides isolation between the uninterruptible power supply 100 and a load.

In some embodiments, the bypass switch 140 couples the AC power source 155 or the input 145 with the output 150, bypassing at least some components of the uninterruptible power supply 100 (e.g., the rectifier 110) to provide power to the output 150 in a bypass mode of operation. For example, the controller 120 controls the bypass switch 140 to operate in the bypass mode when the power quality from the AC power source 155 is within a tolerance range, or when there is a failure of the rectifier 110 or other component of the uninterruptible power supply 100.

In some embodiments, the UPS 100 includes one or more sensors 160 that monitor the output power. The sensors 160 are coupled to the output 150 and/or a DC bus of the UPS 100 and to the controller 120 to measure parameters of the output power and provide the information to the controller 120. The controller 120 receives information from the sensors 160 and operates the UPS 100 in various modes, depending on the parameters related to the output power. The parameters include measureable characteristics of the output power, including electrical characteristics such as voltage, current, power (kilowatts), and energy (kilowatt hours). For example, the UPS 100 can include a control loop that determines energy drawn from the AC power source 155 and/or the backup power source 125, comparing a DC bus current level with a current reference level and adjusting needed input power. The UPS 100 can run in various modes depending on how much output power is being drawn. For example, the UPS 100 can be rated for a certain maximum or optimal load. In some embodiments, if the load on the UPS 100 is low relative to the rated load, the UPS 100 can use one, two, or three of the three phases of the input power.

In some embodiments, the controller 120 includes at least one processor or other logic device. In some embodiments, the controller 120 includes a digital signal processor (DSP). The controller 120 may also include at least one field programmable gate array (FPGA) and an application specific integrated circuit (ASIC), or other hardware, software, firmware, or combinations thereof. In various embodiments, one or more controllers may be part of the UPS 100, or external to but operatively coupled with the UPS 100. Sensor filters, as further described below, may be part of the controller 120 or a separate device that outputs data responsive, at least in part, to instructions from the controller 120. In some embodiments, the filters can be implemented in software, hardware, firmware, or combinations thereof.

Figure 2:
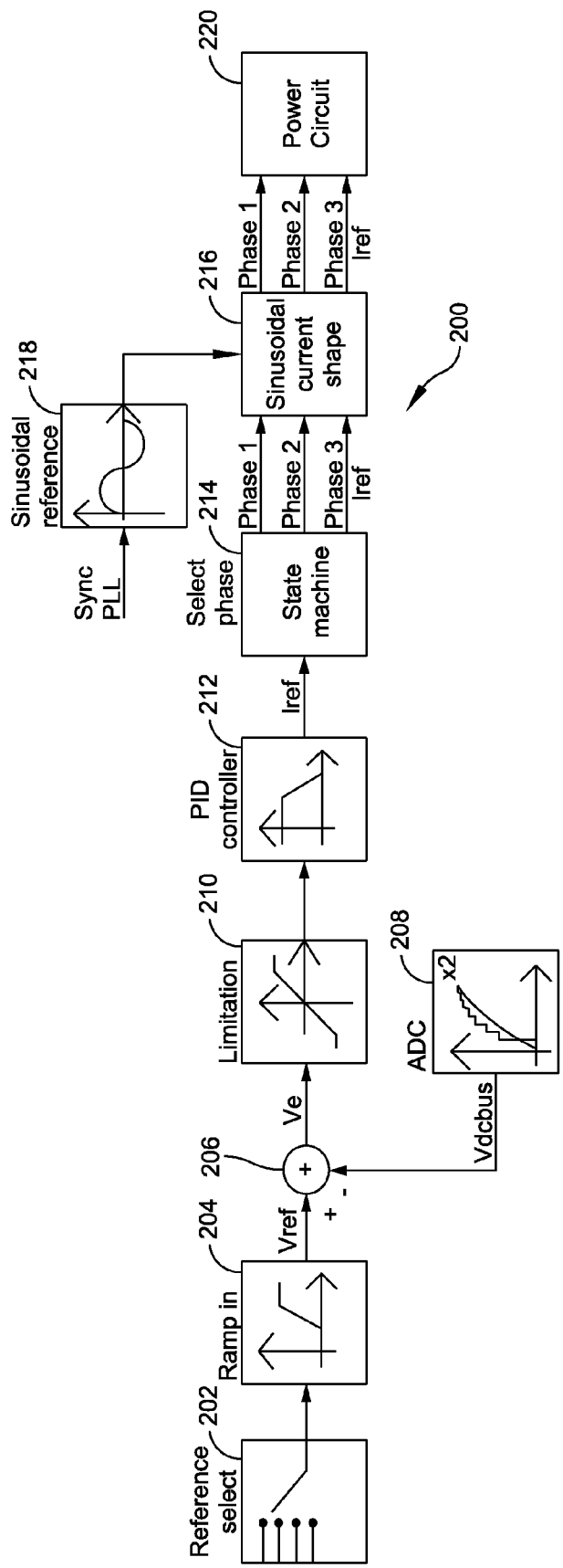
FIG. 2 is a functional block diagram of an example control structure of an uninterruptible power supply in accordance with an embodiment.

FIG. 2 shows a block diagram of an example control structure 200, which can be implemented, for example, by the controller 120 of the UPS 100. In some embodiments, the control structure 200 includes a reference selector 202, which selects a reference voltage level for a DC bus of the UPS 100. For example, a user can configure the UPS to operate with different DC bus voltage levels related to 400V or 480V installations. The control structure 200 also includes a ramp in function 204. The ramp in function 204 can be used during startup of the UPS 100 so that the UPS 100 powers up smoothly with a minimum of overshoot. The ramp in function 204 provides the voltage reference (Vref) to an addition block 206. An analog-to-digital converter (ADC) 208 samples an actual voltage level of the DC bus and outputs a value of the DC bus voltage (Vdcbus). The Vdcbus is negated and provided to the addition block 206 to subtract the DC bus voltage from the reference voltage to calculate an error voltage (Ve). The error voltage is provided to a limitation block 210, which can set limits on the error voltage. In some embodiments, the limits are set at values optimized by an algorithm. Alternatively or additionally, the limits can be configured by the user. Limits on the error voltage can be used, for example, to dampen the control loop or to minimize overshooting.

The limitation block 210 provides a limited voltage error output to a regulator such as a proportional integral derivative (PID) controller 212. The PID controller 212 receives the voltage error and generates a current reference (Iref) based on the voltage error. The current reference is provided to a phase selector 214, which selects a number of phases from which to draw input current based on the current reference. For example, if the current reference is below a first threshold, the phase selector 214 can select only one phase from which to draw input current for the UPS 100. If the current reference is above the first threshold but below a second threshold, the phase selector 214 can select two phases from which to draw input current for the UPS 100. The selected phases are input to a sinusoidal current shaper 216, which shapes the input current so that the input current is phase corrected. The sinusoidal current shaper 216 also receives a sinusoidal reference from a sinusoidal reference generator 218 with which the sinusoidal current shaper 216 multiplies the current reference to shape the input current so that the input current is phase corrected. The sinusoidal current shaper 216 outputs the phase-corrected current reference to a power circuit 220, which generates an output current based on the current reference. The power circuit 220 can include insulated gate bipolar transistors (IGBTs) and/or metal oxide semiconductor field effect transistors (MOSFETs) to generate the output current.

Figure 3:
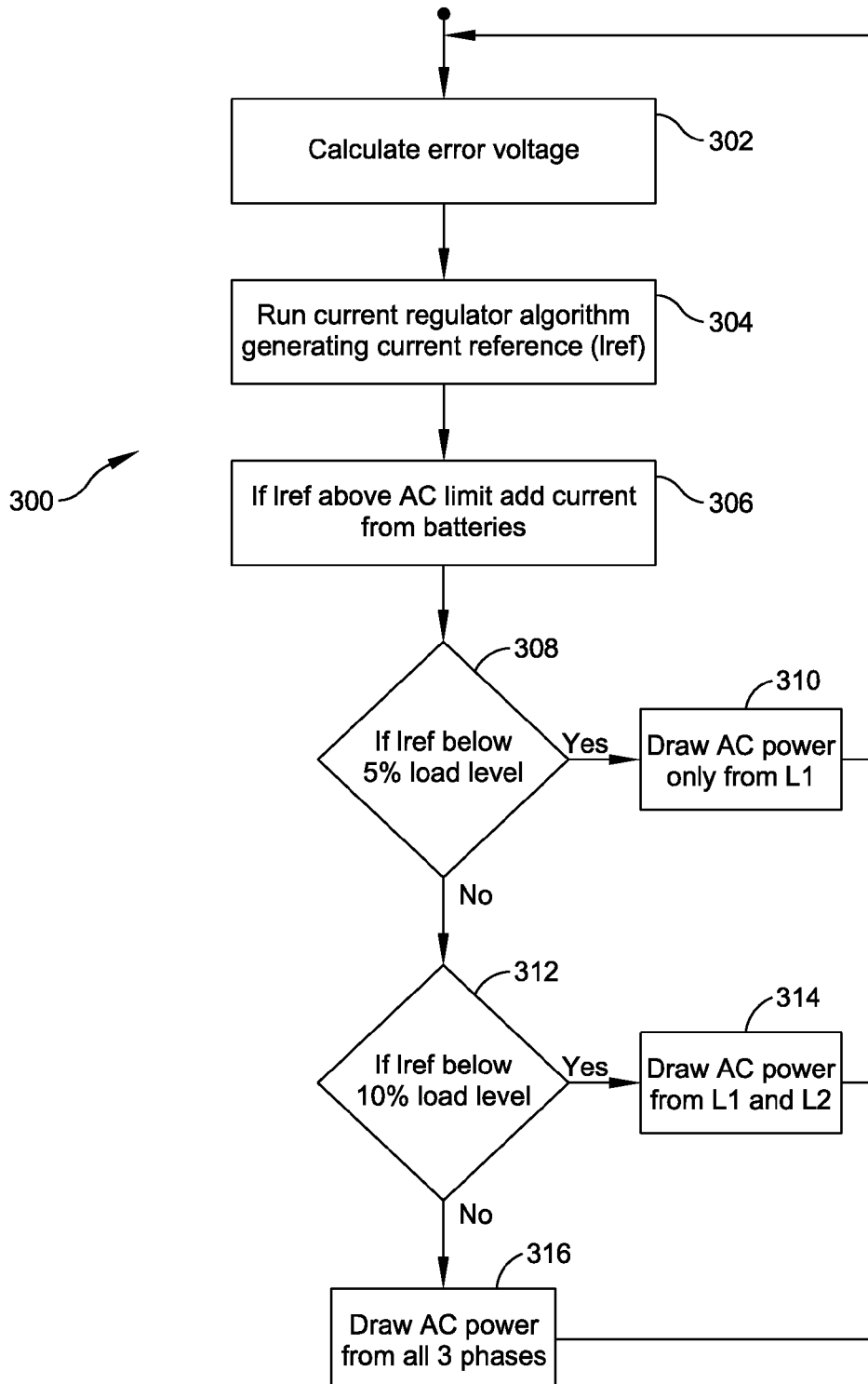
FIG. 3 is a flow chart showing an example process in accordance with an embodiment.

The transitions from drawing power from one phase to two phases and/or drawing power from two phases to three phases can include an algorithm to determine points of transfer and/or a ramping up from one phase to three phases, as well as ramping down from three phases to two and from two phases to one. For example, FIG. 3 shows a flow chart of an example process 300, which can be implemented by the control structure 200 of the controller 120. In some embodiments, the process 300 starts with an error voltage being calculated at stage 302. The error voltage can be calculated as described above, by comparing a measured voltage on the DC bus to a voltage reference. At stage 304, a current regulator algorithm is run, which generates a current reference based on the error voltage. At stage 306, the current reference is compared to a current limit. If the current reference is greater than the current limit, current can be added from a backup power source, such as one or more batteries of the UPS.

At stage 308, the current reference is compared to a first threshold. For example, the first threshold can be 5% of the rated load for the UPS. If the current reference is below the 5% load level, at stage 310, only one phase is used to draw input AC power. The process 300 can then restart, continuing to monitor for changes in the power drawn by the load.

If the current reference is above the first threshold, at stage 312, the current reference can be compared to a second threshold. For example, the second threshold can be 10% of the rated load of the UPS. If the current reference is below the 10% load level, at stage 415, two phases are used to draw input AC power. The process 300 can then restart, continuing to monitor for changes in the power drawn by the load.

If the current reference is above the second threshold, at stage 316, all three phases can be used to draw input AC power. The process 300 can then restart and continue to monitor the power drawn by the load, which can be determined by the error voltage calculation 302. The example transfer points of 5% and 10% of the rated load can also include incorporate a hysteresis (e.g., 1%) to avoid toggling between phase operations at the threshold points. Further, other values may be used for the transfer points in different embodiments.

Figure 4:
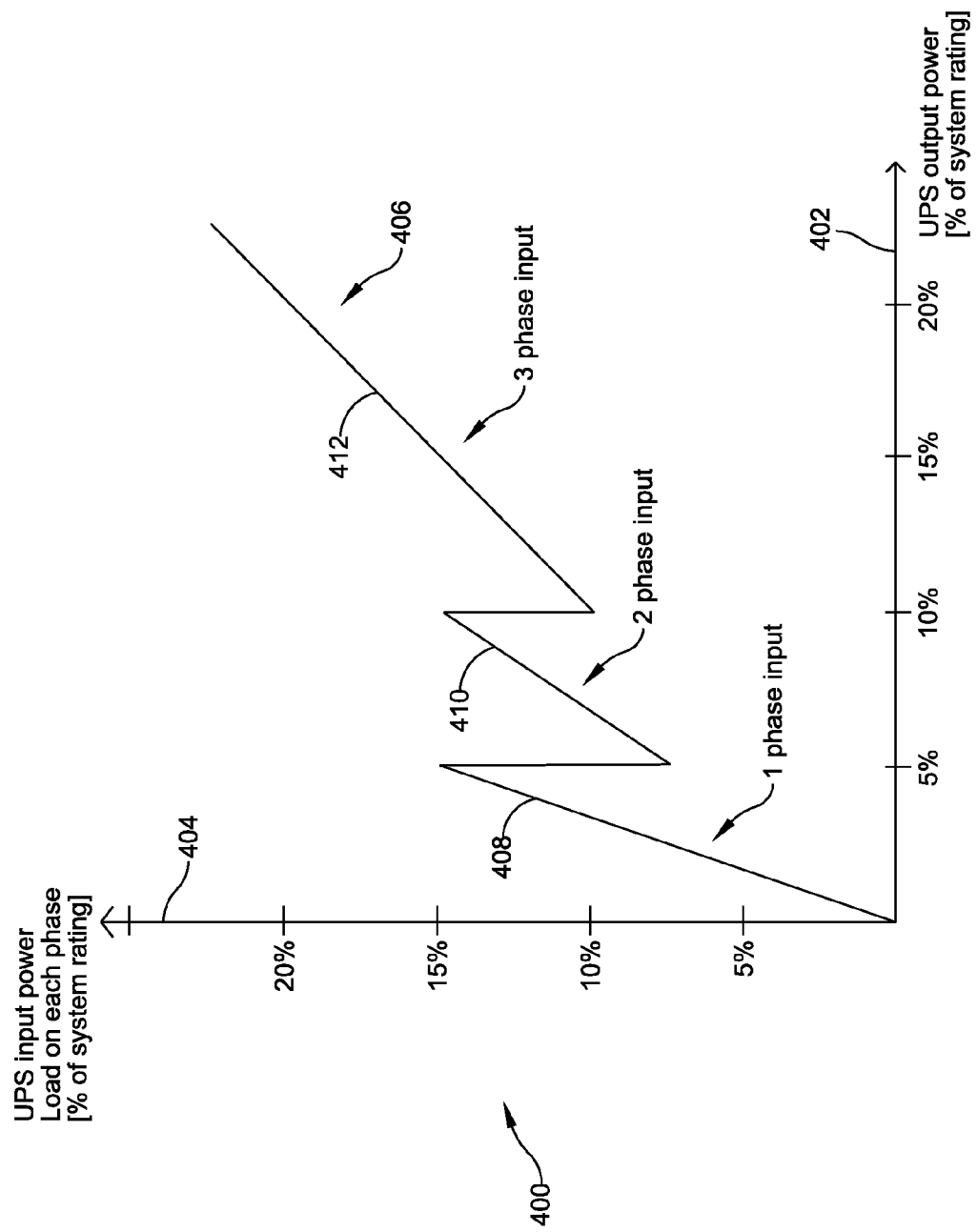
FIG. 4 is a graph showing an example load on phases of an uninterruptible power supply in accordance with an embodiment.

FIG. 4 is a graph 400 of an example transition from one-phase to three-phase operation of the UPS. The graph 400 shows load on each phase 404 measured as a percentage of system rating, as a function of output power 402, also measured as a percentage of system rating. A percentage load plot 406 includes a first section 408, where the UPS is drawing power from one phase. As the output power 402 increases from 0% to 5% of the rated load, the load on the one phase 404 increases from 0% to 15%, as the UPS is operating in a one-phase in, three-phase out mode. Thus, the load on the one phase 404 is three times the output power 402.

As the output power 402 exceeds the first threshold, the UPS transitions to draw power from two phases, operating in a two-phase in, three-phase out mode. A second section 410 of the percentage load plot 406 shows the load on each of the two phases 404 decreases initially to 7.5% as the second phase shares the load of the one phase, and then increases to 15% as the output power 402 increases to 10%. As the two phases are drawn upon to supply power for three phases, the load on each phase 402 is approximately 1.5 times the output power 402, but will be a little higher due to losses in the UPS.

As the output power 402 exceeds the second threshold, the UPS transitions to draw power from all three phases, operating in a three-phase in, three-phase out mode. A third section 412 of the percentage load plot 406 shows the load on each of the three phases 404 decrease initially to 10% and then increase linearly with the output power 402. As three phases of input current are drawn upon to supply power to three phases of output current, the load on each phase 404 approximately equal to the output power 402.

Figure 5:
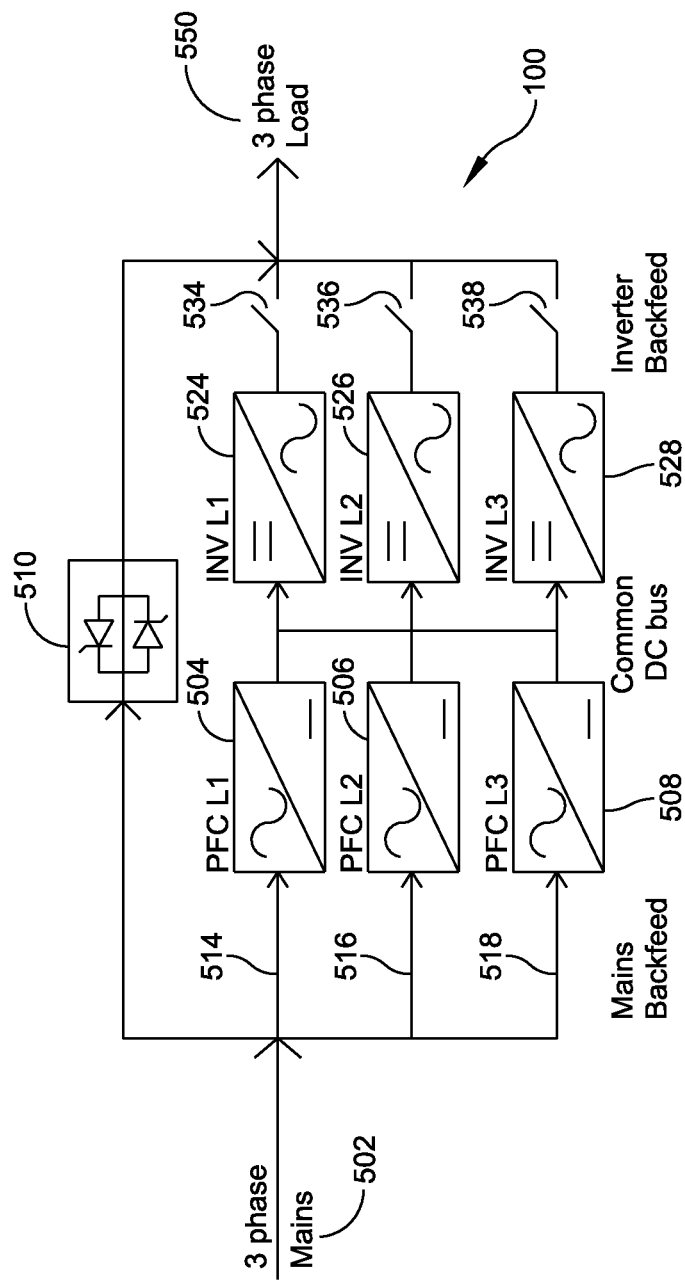
FIG. 5 is a functional block diagram of an example portion of an uninterruptible power supply in accordance with an embodiment.

FIG. 5 is a block diagram 500 showing example portions of the UPS 100. In some embodiments, the UPS 100 includes an input 502 receiving three-phase power, for example, from a utility. The UPS 100 includes first, second, and third PFC circuits 504, 506, 508, each receiving one phase of the three-phase power. The PFC circuits 504, 506, 508 are coupled to the input 502 via first, second, and third mains backfeed switches 514, 516, 518. The switches 514, 516, 518 can be used to control the number of phases of input power that are drawn upon as described above. For example, for the UPS 100 to run in one-phase operation, the first switch 514 can be closed to draw current from the input power, while the second and third switches 516, 518 are opened.

The PFC circuits 504, 506, 508 are connected to a bus 512. In some embodiments, the bus 512 is a common DC bus, coupled to each of the PFC circuits and to first, second, and third inverters 524, 526, 528. The inverters 524, 526, 528 are coupled to an output 550 via first, second, and third inverter switches 534, 536, 538. The output 550 provides three-phase power, for example, to a load. Each of the inverters 524, 526, 528 provides one phase of the three phases of the output power. As the inverters 524, 526, 528 are all coupled to the bus 512, the inverters 524, 526, 528 can output three-phase power from one, two, or three-phase input power as provided by the PFC circuits 504, 506, 508 also all coupled to the bus 512.

As described above, the UPS can draw current from one, two, or three phases of the input power based on parameters, such as a load level. As phases are ramped in, the appropriate mains backfeed switches 514, 516, 518 can be opened or closed to draw current from the desired number of phases. In some embodiments, closing the mains backfeed switches 514, 516, 518 takes a predetermined amount of time. For example, some switches can have a delay before closing. If the load level increases suddenly, a battery 510 can be used as an intermediate power source to provide power to the load until the switch closes. The battery 510 can be coupled to the output 550 and/or to the DC bus 512 and drawn upon for current as needed.

The load level can also be affected by an operating mode of the UPS. For example, if the UPS is running in bypass mode, the load level on the output of the UPS can be higher than a threshold, but the load level on certain components (e.g., the PFC and/or the inverter) of the UPS can be below the threshold, and the UPS can run in one-phase mode. While the examples above have discussed load level as a parameter for determining the number of phases for drawing input power, other parameters of the input and/or output power can also be used.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An uninterruptible power supply, comprising:
    a first input configured to receive input power having three phases;
    a second input configured to receive Direct Current (DC) backup power from a backup power source;
    an output configured to provide output power;
    power conversion circuitry coupled with the first input, the second input, and the output, the power conversion circuitry configured to provide the output power derived from at least one of the input power and the DC backup power to the output;
    one or more sensors configured to monitor one or more parameters related to the output power; and
    a controller coupled with the power conversion circuitry and the one or more sensors, the controller configured to:
        receive, from the one or more sensors, values for the one or more parameters;
        determine that a value of at least one of the one or more parameters is greater than a second threshold; and
        based on the comparison, select three as the number of phases of the input power for receiving power for the power conversion circuitry.

2. The uninterruptible power supply of claim 1, wherein the one or more parameters comprise a percentage load drawn on the uninterruptible power supply, relative to a rated load.

3. The uninterruptible power supply of claim 1, wherein the power conversion circuitry comprises a bus, and the one or more parameters comprise a measured voltage on the bus.

4. The uninterruptible power supply of claim 1, wherein the one or more parameters comprise a current reference of the controller.

5. The uninterruptible power supply of claim 1, wherein the output is configured to provide output power having three phases.

6. The uninterruptible power supply of claim 1, wherein the controller is configured to:
    determine that the value of the at least one of the one or more parameters is less than a first threshold; and
    based on the comparison, select one as the number of phases of the input power for receiving power for the power conversion circuitry.

7. The uninterruptible power supply of claim 1, wherein the controller is configured to:
    determine that the value of the at least one of the one or more parameters is greater than a first threshold and less than the second threshold; and
    based on the comparison, select two as the number of phases of the input power for receiving power for the power conversion circuitry.

8. The uninterruptible power supply of claim 1 further comprising a battery coupled to the output and configured to provide power to the output during a changing of the reduction of the number of phases of the input power.

9. A method for controlling an uninterruptible power supply comprising a first input configured to receive input power having three phases, a second input configured to receive Direct Current (DC) backup power from a backup power source, an output, power conversion circuitry coupled with the first input, the second input, and the output, and a controller coupled with the power conversion circuitry, the method comprising:
    providing, with the power conversion circuitry, output power derived from at least one of the input power and the DC backup power to the output;
    receiving values for one or more parameters related to the output power;
    determining that a value of at least one of the one or more parameters is greater than a second threshold; and
    based on the comparison, selecting three as the number of phases of the input power for receiving power for the power conversion circuitry.

10. The method of claim 9, wherein the one or more parameters comprise a percentage load drawn on the uninterruptible power supply, relative to a rated load.

11. The method of claim 9, wherein the power conversion circuitry comprises a bus, and the one or more parameters comprise a measured current on the bus.

12. The method of claim 9, wherein the one or more parameters comprise a current reference of the controller.

13. The method of claim 9, wherein the output is configured to provide output power having three phases.

14. The method of claim 9 comprising:
    determining that the value of the at least one of the one or more parameters is less than a first threshold; and
    based on the comparison, selecting one as the number of phases of the input power for receiving power for the power conversion circuitry.

15. The method of claim 9 comprising:
- determining that the value of the at least one of the one or more parameters is greater than a first threshold and less than the second threshold; and
- based on the comparison, selecting two as the number of phases of the input power for receiving power for the power conversion circuitry.

16. The method of claim 9, wherein the uninterruptible power supply further comprises a battery coupled to the output and the method further comprises providing power to the output during a changing of the reduction of the number of phases of the input power.

17. An uninterruptible power supply system comprising:
- a first input configured to receive input power having three phases;
- a second input configured to receive Direct Current (DC) backup power from a backup power source;
- an output configured to provide output power;
- power conversion circuitry coupled with the first input, the second input, and the output, the power conversion circuitry configured to provide the output power derived from at least one of the input power and the DC backup power to the output; and
- means for receiving values for one or more parameters related to the output power, and based on the values for the one or more parameters, selecting three as a number of phases of the input power provided to the power conversion circuitry.

* * * * *